(12) United States Patent
Yoshida et al.

(10) Patent No.: US 7,778,863 B2
(45) Date of Patent: Aug. 17, 2010

(54) SYSTEM AND METHOD FOR CUSTOMER BEHAVIOR MOVEMENT FREQUENCY PREDICTION IN A STORE

(75) Inventors: Takufumi Yoshida, Tokyo (JP); Takashi Koiso, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1373 days.

(21) Appl. No.: 11/224,036

(22) Filed: Sep. 13, 2005

(65) Prior Publication Data
US 2006/0179014 A1    Aug. 10, 2006

(30) Foreign Application Priority Data
Feb. 9, 2005    (JP) .............. 2005-32907

(51) Int. Cl.
*G06F 17/30*    (2006.01)
(52) U.S. Cl. ............................................. 705/10
(58) Field of Classification Search ............. 705/10
See application file for complete search history.

(56) References Cited

U.S. PATENT DOCUMENTS

| | | | | |
|---|---|---|---|---|
| 5,541,835 A * | 7/1996 | Dextraze et al. | .............. | 705/10 |
| 5,712,830 A * | 1/1998 | Ross et al. | .................... | 367/93 |
| 5,848,396 A * | 12/1998 | Gerace | ........................ | 705/10 |
| 6,614,348 B2 * | 9/2003 | Ciccolo et al. | .............. | 340/541 |
| 6,928,343 B2 * | 8/2005 | Cato | ........................... | 701/24 |
| 7,006,982 B2 * | 2/2006 | Sorensen | ..................... | 705/10 |
| 7,552,030 B2 * | 6/2009 | Guralnik et al. | ............. | 702/188 |
| 7,606,728 B2 * | 10/2009 | Sorensen | ..................... | 705/10 |
| 2002/0161651 A1 * | 10/2002 | Godsey et al. | ................ | 705/22 |
| 2004/0111454 A1 * | 6/2004 | Sorensen | ................... | 708/200 |
| 2006/0010027 A1 * | 1/2006 | Redman | ....................... | 705/10 |
| 2006/0200378 A1 * | 9/2006 | Sorensen | ..................... | 705/10 |

FOREIGN PATENT DOCUMENTS

| | | | |
|---|---|---|---|
| DE | WO99/14694 | * | 3/1999 |
| JP | 08-202982 | | 8/1996 |
| JP | 2002-259672 | | 9/2002 |
| JP | 2003-16243 A | * | 1/2003 |

(Continued)

OTHER PUBLICATIONS

Envirosell.com Web Pages Envirosell, Inc. 2001, Retrieved from Archive.org Apr. 6, 2005.*

(Continued)

*Primary Examiner*—Scott L Jarrett
(74) *Attorney, Agent, or Firm*—Finnegan, Henderson, Farabow, Garrett & Dunner, L.L.P.

(57) ABSTRACT

According to an aspect of the present invention, there is provided with a behavior prediction apparatus including: an area attribute database which stores area attributes of each of a plurality of areas in an activity area of customers; an inter-area attribute database which stores inter-area attributes between two areas; a behavior history database which stores behavior history of the customers in the activity area; a movement frequency database generator which generates a movement frequency database representing a movement frequency between the two areas on the basis of the individual behavior history database; and a movement frequency model estimator which estimates a value of a parameter in a movement frequency model having area attributes and inter-area attributes as its input and a movement frequency as its output.

8 Claims, 10 Drawing Sheets

FOREIGN PATENT DOCUMENTS

| JP | 2003-298772 | 10/2003 |
|---|---|---|
| JP | 2004-054439 | 2/2004 |
| JP | 2004-102681 | 4/2004 |
| JP | 2004-264972 | 9/2004 |

OTHER PUBLICATIONS

Gaynor, Mark, Hidden Cameras Reveal Human Side of P-O-P Story P-O-P Times, 1999, Retreived from Archive.org Apr. 6, 2005.*
Sixsmith, AJ, An evaluation of an intelligent home monitoring system Journal of Telemedicine and Telecare, 2000.*
Larson, Jeffery S. et al., An Exploratory Look at Supermarket Shopping Paths Jul. 2004.*
Guralnik, Valerie et al., Lenaring Models of Human Behavior with Sequential Patterns AAAI02 Workshop Automation as Caregiver, 2002.*
Noury, Norbet et al., Monitoring Behavior in Home Using a Smart Fall Sensor IEEE, 1$^{st}$ Annual Special Topic Conference on Microtechnologies in Medicine & Biology, Oct. 2000.*
Sorenson, Herb, The Science of Shopping Marketing Research, Fall 2003, pp. 30-35.*
Farley, John U. et al., A Stochastic Model of Supermarket Traffic Flow Operations Research, vol. 14, No. 4, Jul./Aug. 1966.*
Tag Team: Tracking the Patterns of Supermarket Shoppers Knowledge@Wharton, Jun. 1, 2005.*
Heller, Walter, Tracking Shoppers Through the Combination Store Progressive Grover, Nov. 1988, pp. 47-64.*
Underhill, Pact, Why We Buy—The Science of Shopping Simon & Schuster, 1999 ISBN:0-684-84913-5.*
Ma, Sylvia See-Wal, Retail Patronage in The Supermarket Industry University of Toronto, 1981, AAT NK53106.*
Keeping track of the customers Retail Business: Market Surveys, Sep. 1997.*
Stauffer, Chris et al., Learning Patterns of Activity Using Real-Time Tracking IEEE Transactions on Pattern Analysis and Machine Intelligence, vol. 22, No. 8, Aug. 2000.*
Robins, Gary, Retailers explore new applications for customer counting technology Stores, vol. 76, No. 9, Sep. 1994.*
Harrell, Gilbert D. et al., Path Analysis of Buyer Behavior Under Conditions of Crowding Journal of Marketing Research, vol. 17, No. 1, Feb. 1980.*
Schwarts, Ephraim, Tracking technology sheds light on shopping habits Infoworld, Apr. 2, 2002.*
Notification of Reasons for Rejection issued by the Japanese Patent Office on Jan. 23, 2009, in counterpart Japanese Application No. 2005-032907 and English translation thereof.
Takahiro Kudo et al., "Time/Date Category Driven Method with Entropy for Destination Prediction," Journal of Japan Society for Fuzzy Theory and Intelligent Informatics, 16:6, pp. 551-560, Dec. 15, 2004.
Takeshi Haida et al., "Peak Load Forecasting Using Multiple Years Data with Trend Data Processing Techniques," The Transactions of the Institute of Electrical Engineers of Japan, 117-B:8, pp. 1101-1108, Jul. 20, 1997.
Takashi Koiso et al., "Behavior Analysis of Customers and Sales Clerks in a Home Appliance Retail Store Using a Trail Analyzing System," IPSJ SIG Technical Reports, 2003:115, pp. 61-66, Nov. 19, 2003.

* cited by examiner

| PID | SEX DISTINCTION | AGE | . . . . |
|---|---|---|---|
| 001 | MALE | 21 | |
| 002 | FEMALE | 32 | |
| ⋮ | ⋮ | ⋮ | |

FIG. 4

| ARRIVAL TIME | STAY PERIOD | TID | AREA | BEHAVIOR | . . . . |
|---|---|---|---|---|---|
| 13:02 | 2:01 | 012 | A6 | CONTACT | |
| 13:04 | 4:12 | 003 | A1 | POP OBSERVATION | |
| ⋮ | ⋮ | ⋮ | ⋮ | ⋮ | |

FIG. 5

| AREA | AREA SIZE | ASSORTMENT OF GOODS | CUSTOMER CONTACT FREQUENCY | DISTANCE FROM ENTRANCE | DEGREE OF UNIQUE PREFERENCE | . . . . |
|---|---|---|---|---|---|---|
| A1 | 4.2 | 2 | 1 | 25 | 1 | |
| A2 | 10.5 | 5 | 3 | 7 | 5 | |
| ⋮ | ⋮ | ⋮ | ⋮ | ⋮ | ⋮ | |

FIG. 7

| INTER-AREA | DISTANCE | AVERAGE PATHWAY WIDTH | NUMBER OF CORNERS | DEGREE OF CONFIRMATION | DEGREE OF COMMODITY SIMILARITY | DEGREE OF DIRECTION PREFERENCE | . . . . |
|---|---|---|---|---|---|---|---|
| A1:A2 | 5.2 | 2.1 | 1 | 5 | 3 | 5 | |
| A1:A5 | 7.8 | 1.2 | 2 | 2 | 1 | 2 | |
| A2:A1 | 5.2 | 2.1 | 1 | 2 | 3 | 1 | |
| ⋮ | ⋮ | ⋮ | ⋮ | ⋮ | ⋮ | ⋮ | |

FIG. 8

SYSTEM AND METHOD FOR CUSTOMER BEHAVIOR MOVEMENT FREQUENCY PREDICTION IN A STORE

CROSS-REFERENCE TO RELATED APPLICATIONS

This application claims the benefit of priority under 35USC §119 to Japanese Patent Application No. 2005-32907 filed on Feb. 9, 2005, the entire contents of which are incorporated herein by reference.

BACKGROUND OF THE INVENTION

1. Field of the Invention

The present invention relates to a technique used to estimate a behavior selection model of a human or other mobile object on the basis of attributes of an individual, attributes of a field, and behavior history including moving trail information. In particular, the present invention relates to a behavior prediction apparatus, a behavior prediction method, and a behavior prediction program used to estimate a behavior selection model in which the movement frequency in the field is taken in as an influence exerted upon the behavior selection of an individual by a movement of a group.

2. Related Art

The model used to predict behavior selection of an individual or a group in a specific field is regarded important in the field of architecture, civil engineering, marketing and so on, and it is under vigorous study. Its main model is the probabilistic utility maximization model having attributes of an individual acting in the field and attributes associated with the field as explanatory variables. As examples, a logit model and a probit model can be mentioned. As application examples of these models, there are route selection conducted by travelers in transportation behavior and selection of purchase commodities conducted by customers (shoppers) in stores and mail-order business.

The conventional behavior selection model is suitable for taking in the influence exerted upon the behavior selection probability by the attributes of the individual and the attributes of the field. However, a model obtained by satisfactorily taking in the influence exerted upon the individual's selection by a movement of a surrounding group, i.e., the effect provided for the field by a crowd is not sufficiently considered. As an example in which the effect provided for the field by the crowd is conspicuous, behavior selection of a customer (shopper) in a retail store can be mentioned. It is considered that the behavior selection of the customer in the store, such as staying in a salesroom, movement between salesrooms and a commodity purchase/non-purchase, is remarkably influenced not only by the attributes of the customer and the attributes of the field such as the salesroom and commodity but also by the behavior of the surrounding group. In the conventional behavior selection model, however, this influence is not taken in satisfactorily, and it cannot be said that the behavior of the customer in the store is sufficiently modeled.

SUMMARY OF THE INVENTION

According to an aspect of the present invention, there is provided with a behavior prediction apparatus comprising: an area attribute database which stores area attributes of each of a plurality of areas in an activity area of customers; an inter-area attribute database which stores inter-area attributes between two areas; a behavior history database which stores behavior history of the customers in the activity area; a movement frequency database generator which generates a movement frequency database representing a movement frequency between the two areas on the basis of the behavior history database; and a movement frequency model estimator which estimates a value of a parameter in a movement frequency model having area attributes and inter-area attributes as its input and a movement frequency as its output.

According to an aspect of the present invention, there is provided with a behavior prediction method comprising: reading out data from a behavior history database which stores behavior history of customers in an activity area; generating a movement frequency database representing a movement frequency between two areas in the activity area; reading out data from an area attribute database which stores area attributes of each of a plurality of areas in the activity area, an inter-area attribute database which stores inter-area attributes between two areas, and the movement frequency database; and estimating a value of a parameter in a movement frequency model having area attributes and inter-area attributes as its input and a movement frequency as its output.

According to an aspect of the present invention, there is provided with a behavior prediction program to make a computer execute: reading out data from a behavior history database which stores behavior history of customers in an activity area; generating a movement frequency database representing a movement frequency between two areas in the activity area; reading out data from an area attribute database which stores area attributes of each of a plurality of areas in the activity area, an inter-area attribute database which stores an inter-area attributes between two areas, and the movement frequency database; and estimating a movement frequency model having area attributes and inter-area attributes as its input and a movement frequency as its output.

BRIEF DESCRIPTION OF THE DRAWINGS

FIG. 4 is a diagram showing an example of a structure of an individual attribute database;

FIG. 5 is a diagram showing an example of a structure of an individual behavior history database;

FIG. 7 is a diagram showing an example of a structure of an area attribute database;

FIG. 8 is a diagram showing an example of a structure of an inter-area attribute database;

DETAILED DESCRIPTION OF THE INVENTION

Hereafter, embodiments of the present invention will be described with reference to the drawings.

Figure 1:
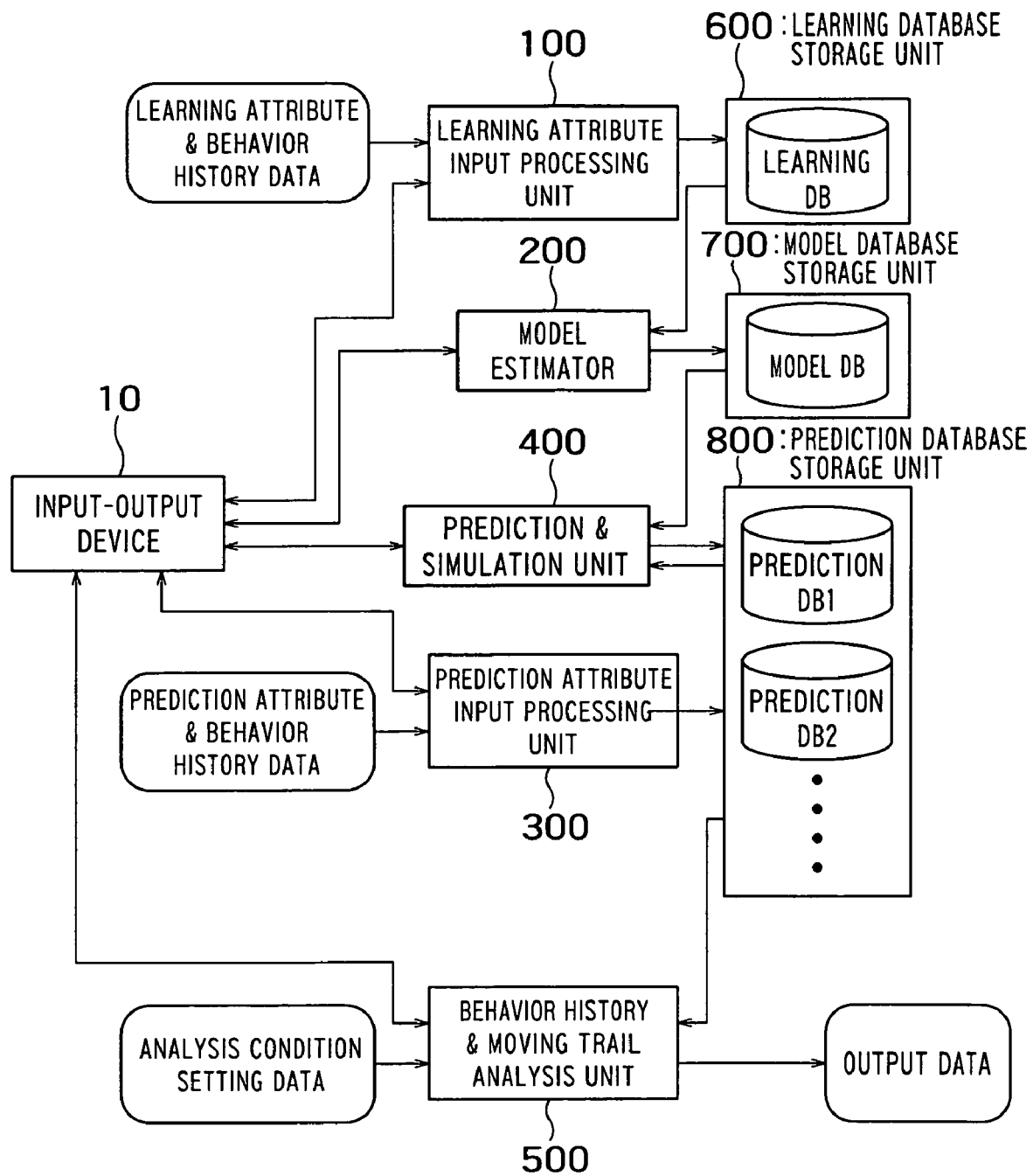
FIG. 1 is a block diagram showing a customer behavior prediction system according to an embodiment of the present invention.

FIG. 1 is a schematic block diagram showing a configuration of a customer behavior prediction apparatus according to an embodiment of the present invention.

The customer behavior prediction apparatus includes a learning attribute input processing unit 100, a model estimator 200, a prediction attribute input processing unit 300, a prediction & simulation unit 400 and a behavior history & moving trail analysis unit 500. Functions of the learning attribute input processing unit 100, the model estimator 200, the prediction attribute input processing unit 300, the prediction & simulation unit 400 and the behavior history & moving trail analysis unit 500 may be implemented by causing a computer such as a CPU to execute a program generated by an ordinary programming technique or by using hardware. Furthermore, the program may be stored on a computer-readable recording medium.

The customer behavior prediction apparatus further includes a learning database storage unit 600 which stores a learning database, a model database storage unit 700 which stores a model database, and a prediction database storage unit 800 which stores a prediction database.

The customer behavior prediction apparatus further includes an input-output device 10 which is supplied with various data and which displays or outputs various data. The input-output device 10 includes an input device such as a keyboard and an output device such as a display.

Hereafter, features of the customer behavior prediction apparatus will be described briefly.

In the customer behavior prediction apparatus, the prediction & simulation unit 400 predicts and simulates behavior selection of an individual on the basis of the attributes of the field and the attributes of the individual, which are stored in the prediction database storage unit 800. The prediction & simulation unit 400 conducts this with respect to a plurality of individuals. The behavior history & moving trail analysis unit 500 conducts moving trail analysis on customer movement in the field on the basis of the result obtained by the prediction & simulation unit 400. A prediction formula (behavior selection model) used for the prediction of the behavior selection is estimated in the model estimator 200 on the basis of the learning database stored in the learning database storage unit 600. It is one of aims of the present embodiment to improve the estimation precision of a model estimation coefficient and improve the precision of behavior selection prediction in the field as a prediction subject by approximately taking the influence of the movement of the surrounding group on individuals into the behavior selection model when estimating the behavior selection model.

Such a customer behavior prediction apparatus can be applied to estimation of the behavior selection model of a customer in a retail store, and prediction and simulation of behavior as an example. Influence exerted upon selection of a behavior such as purchase and movement of a customer, by attributes associated with the field such as the assortment of goods in a salesroom located near a customer and the area size of the salesroom, individual attributes such as the sex distinction, age and taste of a customer, and movement of a surrounding group is evaluated into a behavior selection model. The behavior of the customer in the store can be simulated properly by using this behavior selection model.

Hereafter, units shown in FIG. 1 will be described in further detail with a mind to an example of application to a retail store.

The learning attribute input processing unit 100 conducts processing of storing learning data for calculation of the model estimation coefficient into the learning database in the database storage unit 600.

Figure 2:
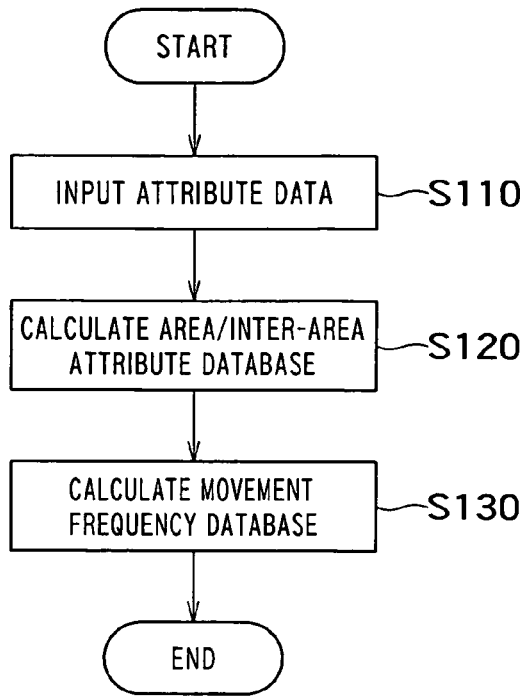
FIG. 2 is a flow chart showing processing conducted in a learning attribute input processing unit.

FIG. 2 is a flow chart showing a flow of processing of storing learning data into the learning database in the database storage unit 600.

The learning attribute input processing unit 100 shown in FIG. 1 urges a user to input attribute data by outputting an interface view which is not illustrated to the input-output device 10 (S110). The user inputs data by inputting data in accordance with display on the interface view, or by previously preparing a file containing data in accordance with a predetermined format and specifying its file name. Input data are classified into individual attributes, field attributes, and individual behavior history. Hereafter, the individual attributes, field attributes, and individual behavior history will be described specifically.

First, the individual attributes will be described.

Figure 3:
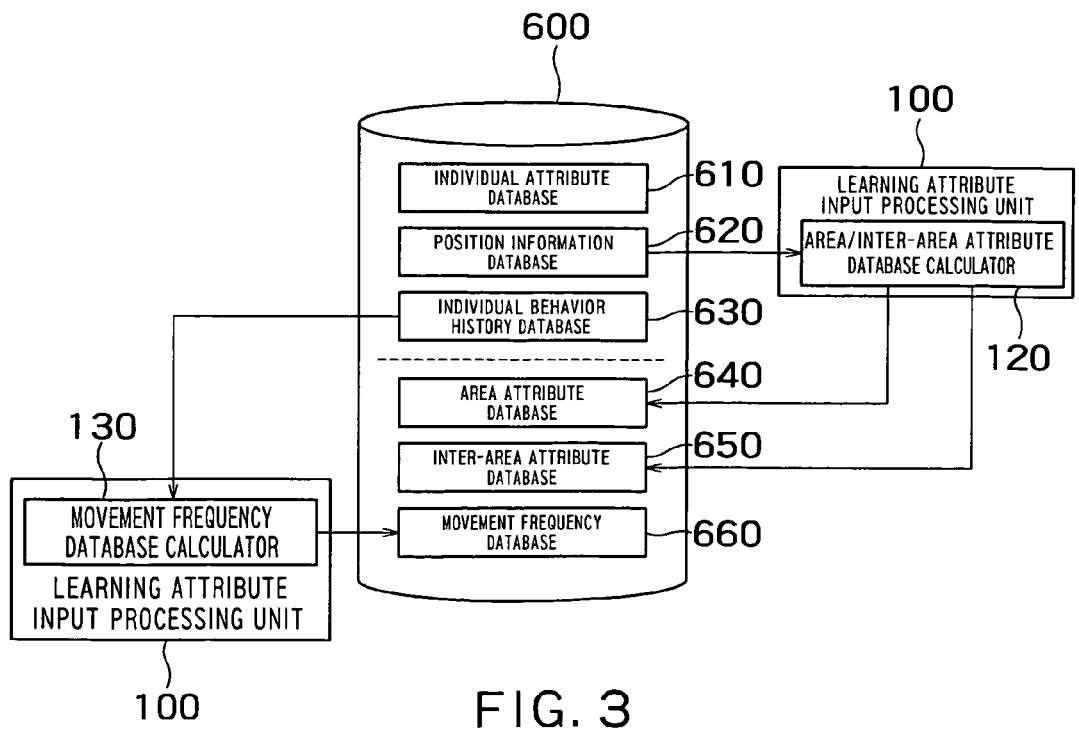
FIG. 3 is a diagram showing a concrete example of a structure of a learning database storage unit.

Customers in the store are assigned unique IDs (PID1, PID2, ..., PIDN), and customers and their individual attributes are linked by the PIDS. Individual attributes, such as the sex distinction, age, occupation, and group configuration at the time of coming to the store, of a customer PIDn are denoted by $PV(n,i)$ ($i=1, 2, \ldots, I$). The value assumed by $PV(n,i)$ may be quantitative or qualitative. As shown in FIG. 3 which shows configurations of the learning attribute input processing unit 100 and the learning database storage unit 600 in detail, an individual attribute database 610 is retained in the learning database storage unit 600. The learning attribute input processing unit 100 shapes individual data of customers input from the input-output device 10 so as to have, for example, PIDn in an element of the nth row and the first column in the database and have $PV(n,i)$ in an element of the nth row and the (i+1)th column, and stores a result in the individual attribute database 610. An example of the individual attribute database 610 is shown in FIG. 4.

The attributes of the field will now be described.

Attributes FV of the field in the store are described on the basis of a plurality of areas. The area is, for example, a region of each salesroom. Adjacent salesrooms handling similar commodities may be handled as one area. The attributes of the field are classified into attributes unique to the area, such as the area size of the area and the assortment of goods, attributes between areas, such as the distance between areas and category similarity of articles for sale, and attributes of the whole store, such as the store scale and the scale of a parking lot. The value assumed by the attributes. FV may be quantitative or may be qualitative. The value of the attributes FV input from the input-output device 10 is stored in a position information database 620 (see FIG. 3) retained in the learning database storage unit 600.

The individual behavior history will now be described.

Customers exhibit various behaviors such as observing POP (Point of Purchase advertising) and purchasing commodities while making a round in the shop. In the present embodiment, movement of a customer in the store is represented by a shift between the areas. As an example of observing the movement history in the store, use of a wireless tag system will be mentioned. It is possible to observe a customer having a wireless tag provided with a unique ID (TID) since the customer arrives at an area until the customer leaves the area (one stay event) by installing one or more wireless tag readers in each area and adjusting a detection range. Here, it is not necessary that the PID of the customer is the same as the TID of the wireless tag. However, it is supposed that the information of their association is stored in, for example, the learning database storage unit 600. In addition, behavior of a customer in the area can be identified by combining the wireless tag system with an image pickup technique using, for example, a camera. Information of individual behavior history obtained by these observations is input from the input-output device 10, shaped in a form of (arrival time, stay time, TID, area name, behavior, . . . ) by the learning attribute input processing unit 100 per one stay event, and stored in an individual behavior history database 630 in the learning database storage unit 600. An example of the individual behavior history database 630 is shown in FIG. 5.

As heretofore described, the individual attributes, the field attributes and the individual behavior history are stored respectively in the individual attribute database 610, the position information database 620, and the individual behavior history database 630 in the learning database storage unit 600. Then, as shown FIG. 3, an area/inter-area attribute database calculator 120 in the learning attribute input processing unit 100 extracts area attributes and inter-area attributes (calculates new area attribute values and new inter-area attribute values as occasion demands) from data in the position information database 620, and stores values of their attributes respectively in an area attribute database 640 and an inter-area attribute database 650 (S120 in FIG. 2). The area attributes and the inter-area attributes are used as the explanatory variables in movement frequency model estimation (see FIG. 6) conducted in the model estimator 200 (see FIG. 1) described later. Hereafter, the area attributes and the inter-area attributes will be described more specifically.

First, the area attributes will now be described.

An area attribute $AV(m,j)$ (j=1, 2, . . . , J) in an area Am (m=1, 2, . . . , M) is an attribute unique to the area among attributes FV of the field or composite attributes of FV (attributes representing values obtained by conducting arithmetic operations by using a plurality of attributes). The area attribute $AV(m,j)$ is an attribute that exerts influence upon an average preference degree of Am which serves as a shift origin area or a shift destination area of a customer. In other words, the area attributes are attributes that influence the average dropping-in rate of a customer for the area. The value assumed by $AV(m,j)$ may be quantitative or may be qualitative. As for the area attributes, there are ones that do not depend on the area position in the store and ones that depend on the area position. As examples of the former ones, the area size of the area, assortment of goods in the salesroom, customer contact frequency, completeness of the POP, and a unique preference degree obtained by evaluating them synthetically can be mentioned. As examples of the latter ones, the distance from an entrance to the area, the distance from a toilet room or a resting room, and the distance from the counter can be mentioned. FIG. 7 shows an example of the area attribute database 640 having Am in an element of the mth row and the first column and having $AV(m,j)$ in an element of the mth row and the (j+1)th column.

The inter-area attributes will now be described.

An inter-area attribute $AAV(l,m,k)$ (k=1, 2, . . . , K) between areas Al and Am is an attribute between areas, among the field attributes FV or composite attributes of FV. The inter-area attributes $AAV(l,m,k)$ is attributes that influence the average preference of a customer to the shift from Al to Am. The value assumed by $AAV(l,m,k)$ may be quantitative or may be qualitative. The inter-area shift is influenced by a point preference degree having the shift destination Am as the destination place and a directional preference degree having Am as the passage place. As examples of the inter-area attributes in association with the former preference degree, the distance between areas, the average path width between areas, the number of corners between areas, category similarity between commodities sold in both areas, and the degree of confirmation of the shift destination area seen from the shift origin area (brought by the POP or a direction indicator) can be mentioned. As examples of the inter-area attributes in association with the latter preference degree, the number of areas having a high area-unique-preference-degree that is present in the shift destination direction can be mentioned. FIG. 8 shows an example of the inter-area attribute database 650 having Al:Am in the first column element of each row and $AAV(l,m,k)$ in the (k+1)th column element.

In the inter-area attribute database 650, it is not always necessary that $AAV(l,m,k)$ is defined between all areas. As an example, a flag $AATr(l,m)$ is retained in the position information database 620. Its value is referred to by the area/inter-area attribute database calculator 120 when creating the inter-area attribute database 650. Only when the value of $AATr(l,m)$ is true, the area/inter-area attribute database calculator 120 writes the corresponding $AAV(l,m,k)$. Here, the flag $AATr(l,m)$ is true when shift from A1 to Am is supposed. Otherwise, the flag $AATr(l,m)$ assumes a value of false (the case where l is equal to m is also included). The shift from the area Al to Am is represented by [l,m]. An inter-area shift set for which $AATr(l,m)$ assumes a value of truth can be represented as a shiftable set D={[l,m]l $AATr(l,m)$==True}. It is effective to consider the shiftable set when, for example, there are such areas that it is difficult to move directly between them without being observed by any other area (for example, such areas that it is difficult to move between them without passing through another area) in the movement history data of customers. Because, in this case, it is considered that the degree of association between (the low frequency of) the shift between the areas and the preference degree is low.

Figure 9:
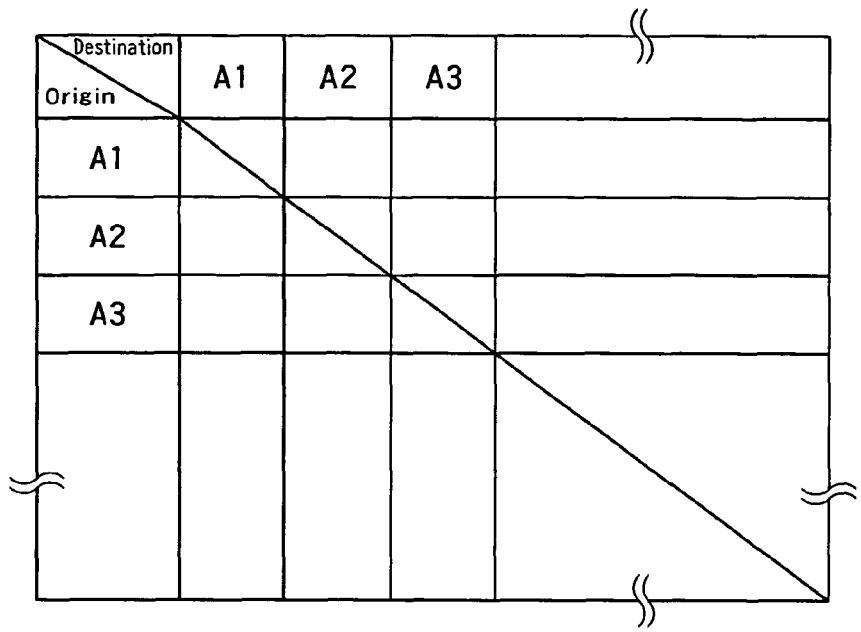
FIG. 9 is a diagram showing an example of a structure of a movement frequency database.

Subsequently, the movement frequency database calculator 130 (see FIG. 3) in the learning attribute input processing unit 100 generates a movement frequency database 660 on the basis of the individual behavior history database 630 in the learning database storage unit 600 (S130 in FIG. 2). The movement frequency database 660 is an OD table (Origin-Destination table) of the inter-area shift or a table based on the frequency of the inter-area shift. For example, if in the individual behavior history database 630 shown in FIG. 5 row data are sorted according to arrival time every the same TID, movement history every customer is obtained. It is now supposed that data from the first row to the l_n row are data of a customer TIDn. An area on the ith row (i=1, 2, . . . , L_n) is denoted by Am_i, and $OD(m\_i,m\_(i+1))$ is incremented by one from i=1 to l_n−1. (But, it is supposed that all $OD(p,q)$ (p=1, 2, . . . , M, q=1, 2, . . . , M) are initialized to 0 in advance). Upon adding up $OD(p,q)$ over all customers, the movement frequency database calculator 130 stores $OD(p,q)$ into an element of the pth row and the qth column. FIG. 9 shows an example of the movement frequency database 660. For example, the total number of times of movements (the number of times of movements corresponding to all customers) from the area A1 to the area A2 is stored in an intersection of an origin A1 and a destination A2. The method for generating the movement frequency database 660 is not restricted to the above-described method, and any method may be used as long as inter-area shifts can be compared with each other. For example, the whole may be normalized by dividing the table by a constant so as to attain $\Sigma_p \Sigma_q OD(p,q)=1$.

If data are stored in all databases 610 to 660 in the learning database storage unit 600, the learning attribute input processing unit 100 displays a message for confirming whether attribute data inputting may be finished, an input end button, and an input retry button on the input-output device 10, and urges the user to make a selection. If retry of attribute data inputting is selected, the learning attribute input processing unit 100 displays the attribute data input view on the input-output device 10 again. If the input end is selected, subsequent processing is transferred from the learning attribute input processing unit 100 to the model estimator 200.

With reference to FIG. 1, the model estimator 200 conducts estimation of the movement frequency model or the behavior selection model or both of them on the basis of the data in the learning database storage unit 600. First, the model estimator 200 displays an interface view which is not illustrated, on the input-output device 10 and urges the user to select a mode of model estimation and input an estimation execution order. In modes (L_MODE), there are three modes: only movement frequency model estimation (OD), only behavior selection model estimation (HB), and both model estimation (BOTH). However, only movement frequency model estimation is made selectable only if the user conducted movement frequency model estimation earlier and the value of the model estimation coefficient estimated at that time and stored in the model database storage unit 700 reflect current data in the learning database storage unit 600.

Figure 6:
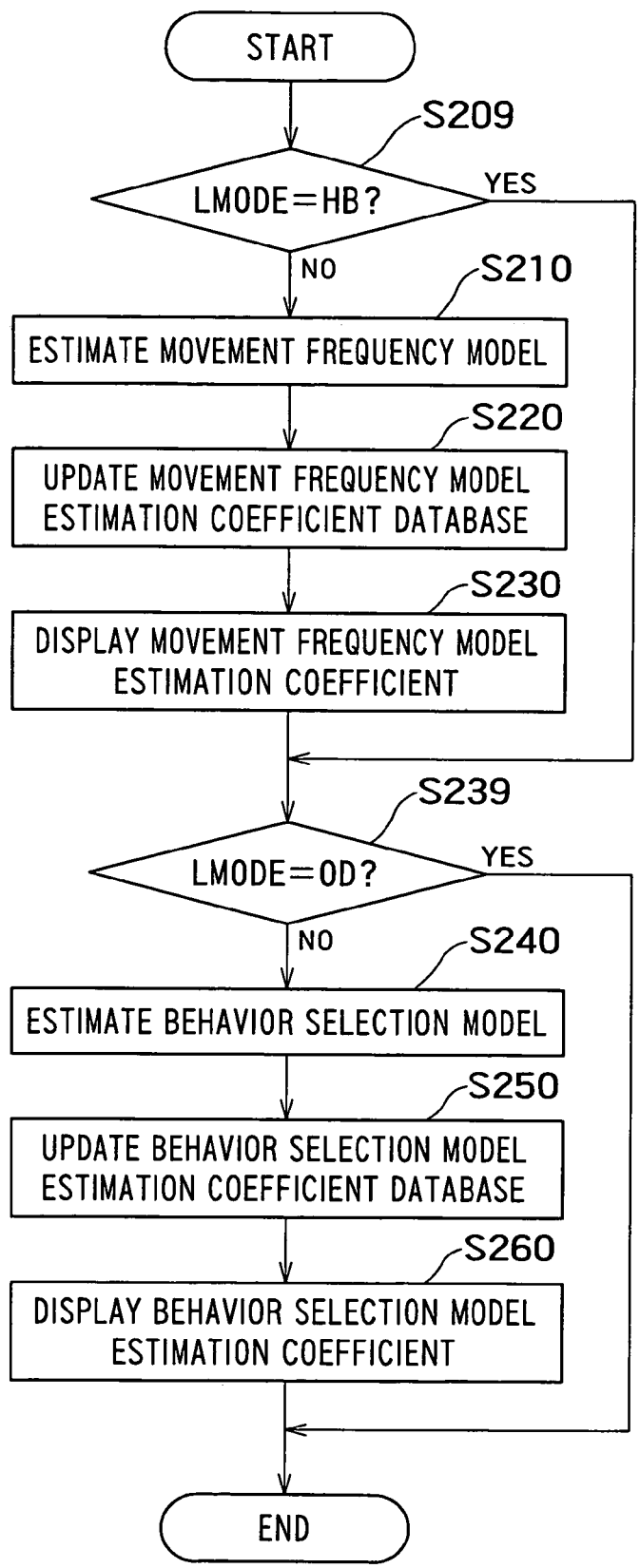
FIG. 6 is a flow chart showing operation conducted by a model estimator.

FIG. 6 is a flow chart showing a flow of processing conducted after the user inputs the mode selection of the model estimation and the estimation execution order.

If the value of the L_MODE is OD or BOTH (NO at S209), transition to processing of the movement frequency model estimation (S210 to S230) is conducted. If the value of the L_MODE is OD after the processing is finished (YES at S239), the processing in the model estimator 200 is finished. If the value of the L_MODE is BOTH (NO at S239), transition to processing of the behavior selection model estimation (S240 to S260) is subsequently conducted. After this processing is finished, the processing in the model estimator 200 is finished. On the other hand, if the value of the L_MODE is HB (YES at S209), transition to processing of the behavior selection model (S240 to S260) is conducted. After this processing is finished, the processing in the model estimator 200 is finished. Hereafter, the movement frequency model estimation processing and the behavior selection model estimation processing will be more specifically.

First, the movement frequency model estimation processing (S210 to S230) will now be described.

In the movement frequency model estimation processing (S210), a movement frequency model estimator 210 in the model estimator 200 (see FIG. 10) estimates a regression model (movement frequency model) having a movement frequency $OD(p,q)$ ($[p,q] \in D$) as its output and having $AV(p,j)$, $AV(q,j)$ and $AAV(p,q,k)$ ($j=1, 2, \ldots, J, k=1, 2, \ldots, K$) as its inputs, on the basis of data stored in the area attribute database 640, the inter-area attribute database 650 and the movement frequency database 660 in the learning database storage unit 600. That is, in the movement frequency model estimation processing (S210), the movement frequency model estimator 210 estimates the values of unknown parameters in a movement frequency model.

First, the movement frequency model estimator 210 in the model estimator 200 urges the user to select or input conditions at the time of model estimation, such as the function type of the regression model, the precision of the model estimation coefficient and a manner of determining the model estimation coefficient. After the user has input the conditions, the movement frequency model estimator 210 in the model estimator 200 conducts model estimation in accordance with the input conditions.

For example, supposing that the movement frequency model regression function specified by the user is $FDL(\theta;p,q)=FDL(\theta; AV(p,1), \ldots, AV(p,J), AV(q,1), \ldots, AV(q,J), AAV(p,q,1), \ldots, AAV(p,q,K))$ (where $\theta$ is a model estimation coefficient, and if there are a plurality of model estimation coefficients, $\theta$ represents a vector), and the manner of determining the model estimation coefficient is the least square method, the movement frequency model estimator 210 in the model estimator 200 calculates a coefficient $\theta$ that minimizes $RSS(\theta)=\Sigma_{pq}(OD(p,q)-FDL((\theta;p,q))^2$ (where $\Sigma_{pq}$ represents the sum over all $[p,q] \in D$). In the present embodiment, $\theta$ is a value which does not depend on p or q. Alternatively, a set D may be segmented according to values of p and q, and $\theta$ may be estimated separately in each segment.

The foregoing description concerns the regression model. Alternatively, probability distribution $Pr(\theta;p,q,od)$ concerning the movement frequency od may be output. In this case, an unknown model estimation coefficient $\theta$ can be estimated by using maximum likelihood estimation which maximizes a likelihood function $LH(\theta)=\prod_{pq}Pr(\theta;p,q,OD(p,q))$. In the ensuing description, $OD(p,q)$ as output of the movement frequency model may contain information of $Pr(\theta;p,q,od)$ in addition to its own information in some cases.

Figure 10:
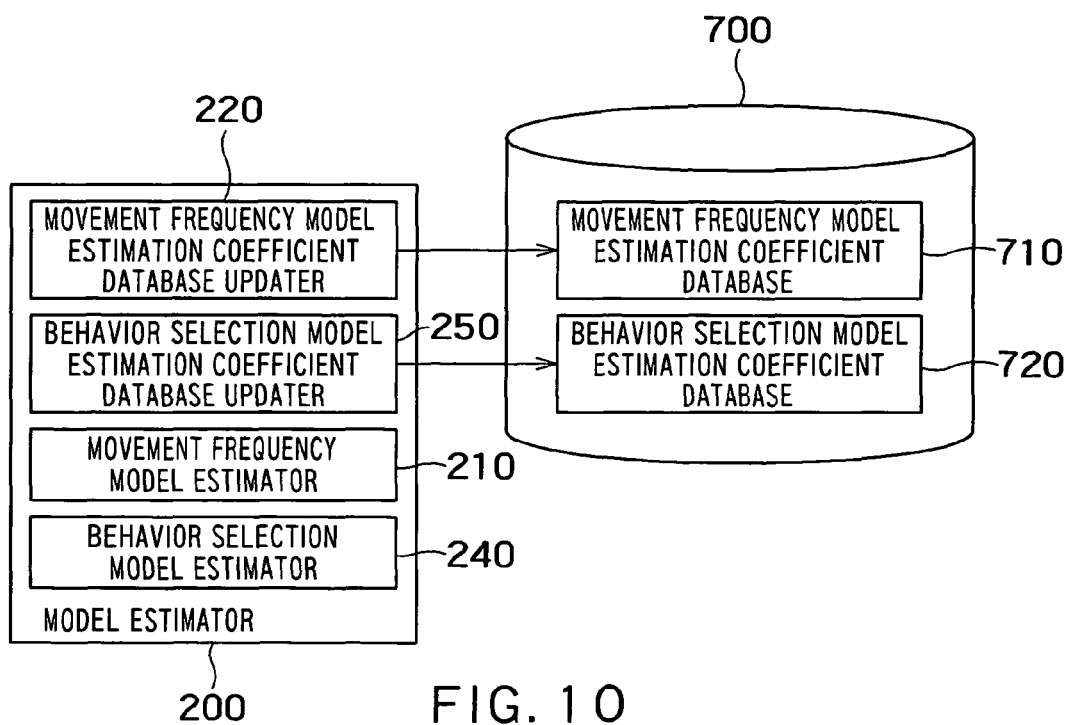
FIG. 10 is a diagram showing a concrete example of a structure of a model database storage unit.

Detailed configurations of the model estimator 200 and the model database storage unit 700 are shown in FIG. 10. The estimated value of $\theta$ is stored in a movement frequency model estimation coefficient database 710 in the model database storage unit 700 together with statistical quantities such as variance of $\theta$ by a movement frequency model estimation coefficient database updater 220 (S220). The movement frequency model estimator 210 in the model estimator 200 displays information stored in the movement frequency model estimation coefficient database 710 on the interface view on the input-output device 10 in accordance with a display condition selected by the user or a predetermined form (S230).

The movement frequency model estimation heretofore described estimates the frequency of average path use (shift between areas) of customers in the store, and it is not based on individual attributes of respective customers. In other words, the individual attribute database 610 in the learning database storage unit 600 is not referred to at the time of the movement frequency model estimation.

The behavior selection model estimation processing (S240 to S260) will now be described.

The behavior selection model estimation (S240) estimates a relational model (behavior selection model) having behavior selection at various decision making stages (such as which area to move and whether to buy a commodity) in a series of behaviors of a customer ranging from entering the shop to leaving the shop as its output and having the individual attributes, the field attributes, the individual behavior history obtained until then, and the path use frequency (movement frequency between areas) as its input. That is, in the behavior selection model estimation (S240), the behavior selection model estimator 240 estimates the values of unknown parameters in the behavior selection model. The behaviors of customers in the store are diversified, and decision making stages to be modeled are also various. As an example, however, estimation of the next area selection model (estimation of the area shift probability) will now be described.

A behavior selection model estimator 240 in the model estimator 200 (see FIG. 10) refers to the databases in the learning database storage unit 600, and uses the individual attribute $PV(n)$ of a customer PIDn, behavior history data PH(n,t) of the PIDn ending at time t, the attributes FV (AV and AAV) of the field, and the movement frequency-data-OD(p, q) as learning data for model estimation. (As for attributes that are originally vector quantities, subscripts of vectors are omitted to simplify the indication.)

It is one of major features in the present embodiment to use the movement frequency data OD(p,q) as learning data in estimation of the behavior selection model. In other words, it is one of aims of the present embodiment to reflect the influence of movement of a surrounding group upon the individuals into the decision making of an individual, by paying attention to the fact that OD(p,q) approximately represents an average movement of the group in the vicinity of the path from the area Ap to Aq and using OD(p,q) as learning data of model estimation.

Subsequently, the behavior selection model estimator 240 in the model estimator 200 urges the user to select or input estimation conditions of the next area selection model, such as the function type of the model, the precision of the model estimation coefficient and a manner of determining the model estimation coefficient, on the interface view on the input-output device 10.

For example, it is supposed that a certain function type $Pr(\theta;n,t,p,q)=Pr(\theta;PV(n),PH(n,t),FV,\{OD\}_{pq})$ is specified as a function that represents the propability that the customer of the PIDn will move from Ap to Aq at time t and the maximum likelihood estimation is specified as the manner of determining the model estimation coefficient. (Here, $\theta$ is the model estimation coefficient. If there are plural model estimation coefficients, $\theta$ represents a vector. Furthermore, $\{OD\}_{pq}$ represents OD(p,q), OD(q,p) and $\Sigma_m OD(p,m)$ etc. If the number of persons or the congestion degree of crowd is known, scale conversion may be conducted by using it.)

In order to generate data to be used in the maximum likelihood estimation, the behavior selection model estimator 240 in the model estimator 200 generates data having (PIDn_u, Al_u, Am_u, TODu) in, for example, the uth row by using the individual behavior history database 630 in the learning database storage unit 600. Al_u represents an area in a stay event in the uth row. Am_u represents an area in the next stay event subsequent to the stay event in the uth row of the customer PIDn_u. TODu represents break-away time in the stay event in the uth row.

Here, in the above-described data, a stay event having Ap as Al_u (shift origin) is retrieved. A set of row numbers of those stay events is denoted by Ep={u|l_u=p}.

By using the above-described data, The behavior selection model estimator 240 in the model estimator 200 calculates every area Ap a coefficient $\theta$ that maximizes $LH(\theta;Ap)=\Pi_u Pr(\theta; n\_u,TODu,p,m\_u)$ (where $\Pi_u$ represents a product with respect to all u∈Ep).

The estimated value of $\theta$ ($\theta$ of the behavior selection model which represents the probability of movement to Aq at time t when the shit origin is Ap) is stored in a behavior selection model estimation coefficient database 720 in the model database storage unit 700 together with statistical quantities such as variance of $\theta$ by a behavior selection model estimation coefficient database updater 250 as shown in FIG. 10 (S250 in FIG. 6).

The behavior selection model estimator 240 in the model estimator 200 displays information stored in the behavior selection model estimation coefficient database 720 on the interface view on the input-output device 10 in accordance with a display condition selected by the user or a predetermined form (S260).

Heretofore, estimation of the next area selection model has been described. Estimation of other behavior selection models can also be conducted in the same way. As regards the estimation of the regression model outputting a continuous value such as a stay time model as well, the unknown model estimation coefficient $\theta$ can be estimated by using a least square method which minimizes the square sum of difference between a stay time function $T(\theta;PV(n),PH(n,t),FV, \{OD\}pq)$ and actual stay time Tn. If estimation of the behavior selection model is finished with respect to all predetermined decision making stages of the customer in the store, the processing in the model estimator 200 is finished. Subsequent processing is taken over by the prediction attribute input processing unit 300.

Figure 12:
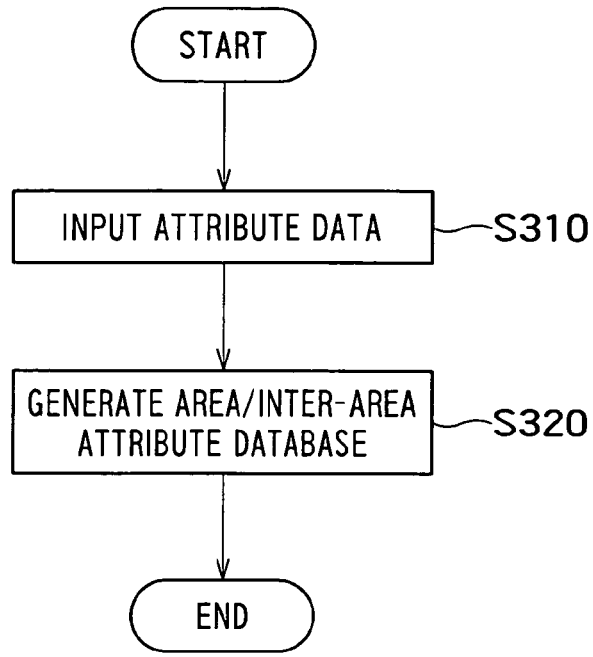
FIG. 12 is a flow chart showing operation of a prediction attribute input processing unit.
Figure 13:
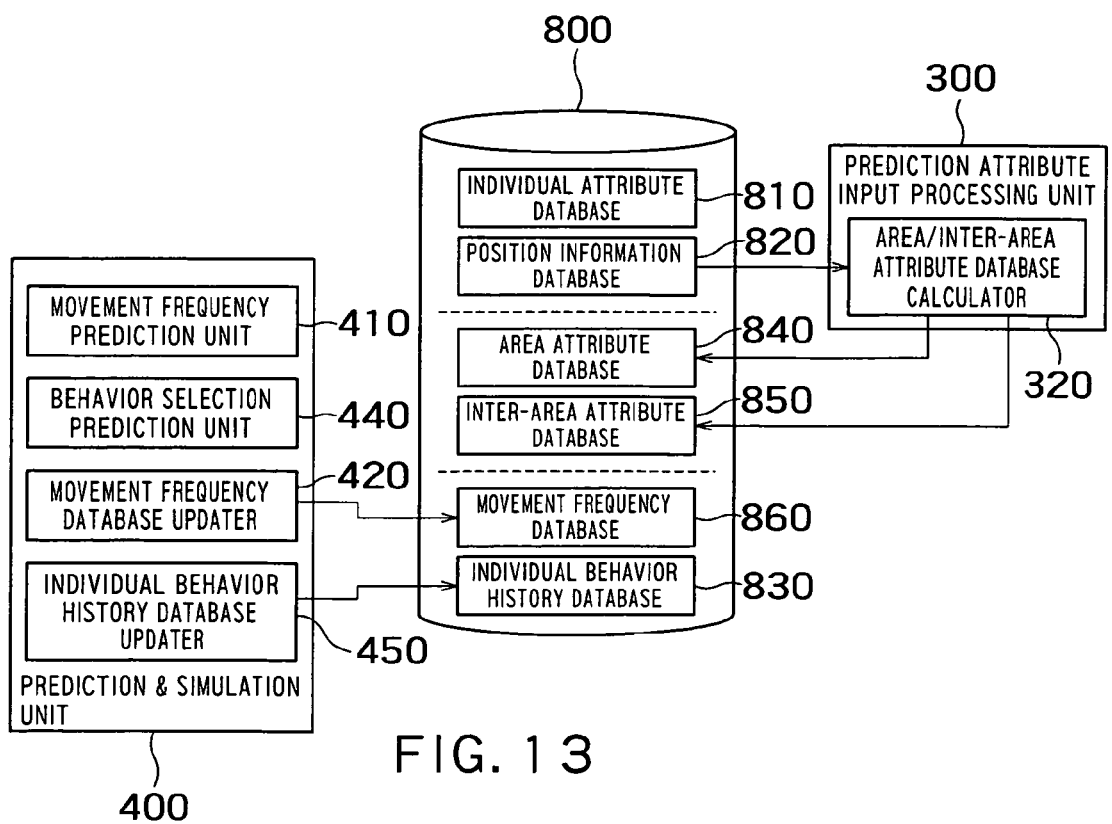
FIG. 13 is a diagram showing a concrete example of a structure of a prediction database storage unit.

FIG. 12 is a flow chart showing a flow of processing conducted by the prediction attribute input processing unit 300. FIG. 13 is a block diagram showing configurations of the prediction attribute input processing unit 300, the prediction database storage unit 800, and the prediction & simulation unit 400 in detail.

The prediction attribute input processing unit 300 displays an input view of attribute data on the input-output device 10 (S310). First, the prediction attribute input processing unit 300 urges the user to input the attribute data of the field, and stores input data in a position information database 820 in the prediction database storage unit 800.

Subsequently, the prediction attribute input processing unit 300 asks the user on a view on the input-output device 10 whether to conduct behavior selection simulation after movement frequency prediction (described later). If the behavior selection simulation is to be conducted (P_MODE=HB), the prediction attribute input processing unit 300 displays an input view of individual attributes, urges the user to input individual attribute data, and stores input data in an individual attribute database 810 in the prediction database storage unit 800. Initial condition data of simulation such as time of coming to the store may be also included in the individual attributes. If the behavior selection simulation is not to be conducted (P_MODE=OD), the prediction attribute input processing unit 300 does not display an input view of individual attributes.

Subsequently, an inter-area attribute database calculator 320 in the prediction attribute input processing unit 300 extracts area attributes and inter-area attributes from the position information database 820 (as occasion demands, the inter-area attribute database calculator 320 calculates new area attributes or new inter-area attributes on the basis of data in the position information database 820) (S320 in FIG. 12). The prediction attribute input processing unit 300 stores the area attributes and the inter-area attributes respectively in an area attribute database 840 and an inter-area attribute database 850 (S320).

Thereafter, the prediction attribute input processing unit 300 displays a view that indicates input end of attribute data on the input-output device 10. Subsequently, the prediction attribute input processing unit 300 transfers processing to the prediction & simulation unit 400.

Figure 14:
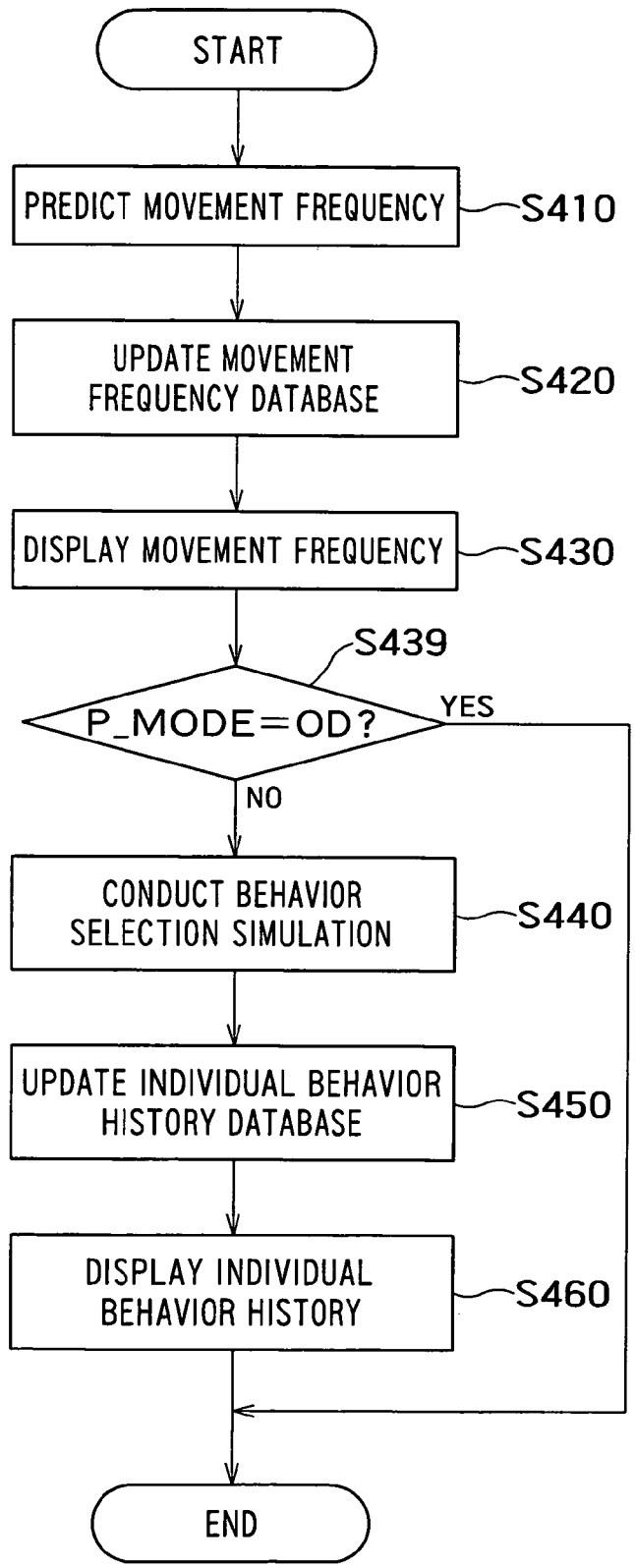
FIG. 14 is a flow chart showing processing conducted by a prediction & simulation unit.

FIG. 14 is a flow chart showing a flow of processing conducted by the prediction & simulation unit 400.

A movement frequency prediction unit 410 in the prediction & simulation unit 400 (see FIG. 13) reads out the model estimation coefficient from the movement frequency model estimation coefficient database 710 in the model database storage unit 700 (see FIG. 10), and predicts the inter-area movement frequency on the basis of the model estimation coefficient read out and values of the area attributes and the inter-area attributes respectively stored in the area attribute database 840 and the inter-area attribute database 850 in the prediction database storage unit 800 (S410).

The movement frequency database updater 420 in the prediction & simulation unit 400 (see FIG. 13) stores the calculated movement frequency OD(p,q) in a movement frequency database 860 in the prediction database storage unit 800 (S420).

The movement frequency prediction unit 410 in the prediction & simulation unit 400 displays values of the movement frequency database 860 on a screen of the input-output device 10 (S430).

If the value of P_MODE is OD (the behavior selection simulation is not to be conducted) (YES at S439), the processing is finished. On the other hand, if the value of behavior P_MODE is HB (NO at S439), the processing proceeds to behavior selection simulation processing (S440 to S460).

A behavior selection prediction unit 440 in the prediction & simulation unit 400 (see FIG. 13) reads out the model estimation coefficient from the behavior selection model estimation coefficient database 720 in the model database storage unit 700 (see FIG. 10), predicts behavior selection of a customer in the store in accordance with a predetermined simulation model on the basis of the model estimation coefficient read out, the individual attribute database 810, the area attribute database 840, the inter-area attribute database 850, the movement frequency database 860 in the prediction database storage unit 800 and individual behavior history which is updated successively. The behavior selection prediction unit 440 successively updates the individual behavior history on the basis of a result of the prediction.

An individual behavior history database updater 450 in the prediction & simulation unit 400 (see FIG. 13) shapes the individual behavior history after the simulation to a form of stay-event-data (see FIG. 5), and stores the stay-event-data in an individual behavior history database 830 in the prediction database storage unit 800 (S450).

The behavior selection prediction unit 440 in the prediction & simulation unit 400 retrieves data stored in the individual behavior history database 830 under a retrieval condition specified by the user, and displays a result of the retrieval on the screen (S460).

Thereafter, the prediction & simulation unit 400 urges the user on the screen on the input-output device 10 to select whether to terminate the processing or whether to conduct moving trail analysis (such as an analysis of rough movement of the customers (crowd) in the store). If the user has selected termination, the processing is finished. If the user has selected the moving trail analysis, subsequent processing is taken over by the behavior history & moving trail analysis unit 500 (see FIG. 1).

Prior to description of the behavior history & moving trail analysis unit 500, the above-described behavior selection simulation (S440) will now be described in more detail.

Figure 11:
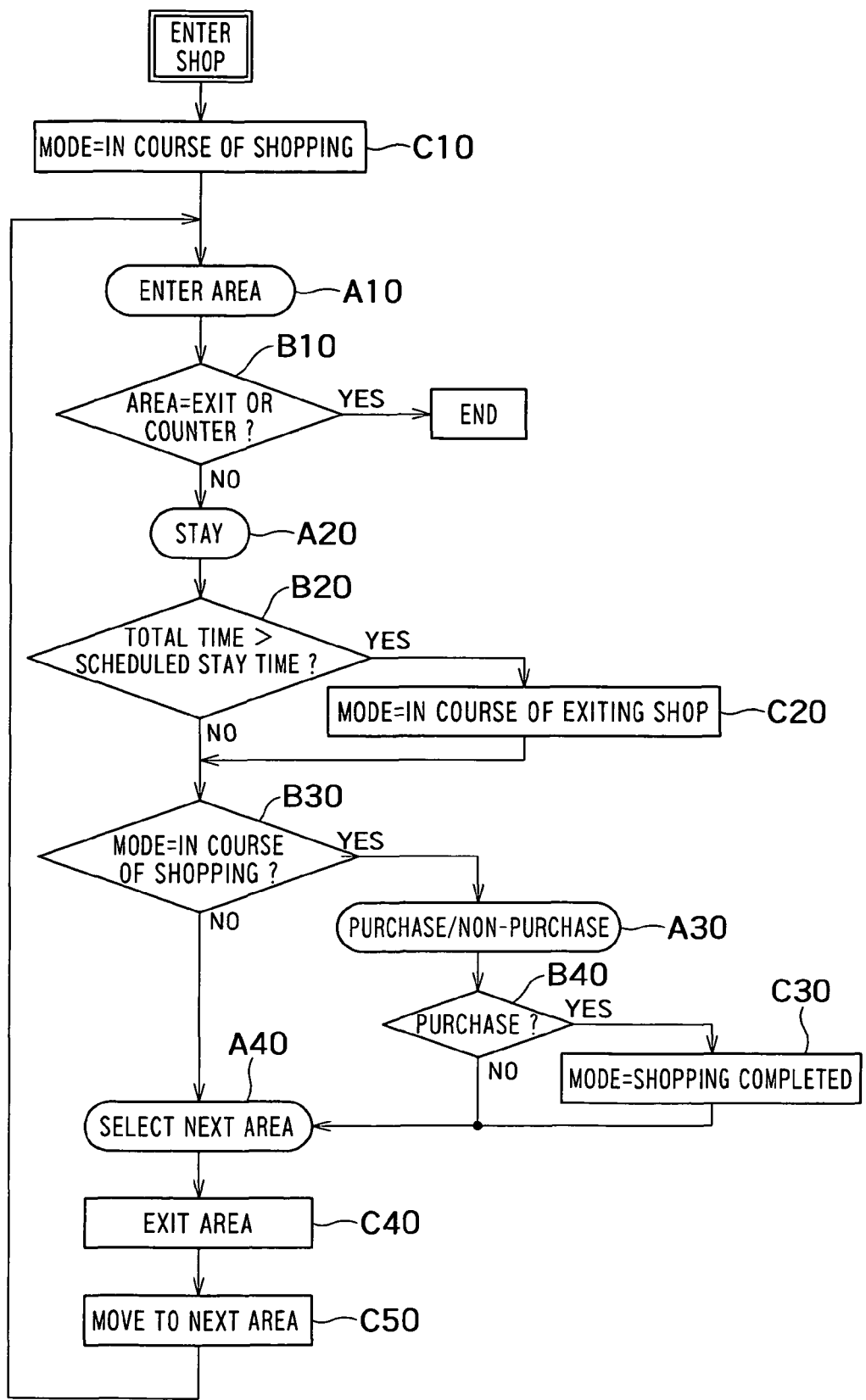
FIG. 11 is a flow chart showing a series of behavior examples of customers in a store.

FIG. 11 is a diagram showing a behavior model example of a customer in the store to be used in the behavior selection simulation.

After entering the store, the customer arrives at an area, stays for some time, makes decision whether to purchase a commodity in a salesroom in the area, and then moves to the next area. The customer repeats the behavior until the customer exits the store or arrives at a counter. The behavior selection simulation is conducted while advancing, for example, time t by a predetermined unit.

First, "in course of shopping" is set as MODE for the customer (C10).

Area entrance A10, stay A20, purchase/non-purchase A30, next area selection A40 and so on correspond to decision making stages. In the respective stages, "whether to stay in the area (whether to head for an exit or a counter)," "whether or not scheduled stay time is elapsed," "whether to purchase," and "the next area name" are determined on the basis of respective outputs of the behavior selection model.

If it is predicted at the decision making stage of the area entrance A10 that the customer heads for the exit or counter (YES at B10), the processing is finished. If it is predicted that the customer stays (NO at B10), the processing proceeds to the decision making stage of the stay A20.

If in the stay A20 the time (total time) elapsed since the customer entered the store is longer than the scheduled stay time of the customer in the store (YES at B20), MODE of the customer is set to "in the course of exiting the store" (C20). If the total time is equal to or shorter than the scheduled stay time in the store (NO at B20) or after C20, it is determined whether the MODE of the customer is "in course of shopping" (B30). If the MODE is "in course of shopping," the processing proceeds to the decision making stage of purchase/non-purchase A30.

If it is predicted in the purchase/non-purchase A30 that the customer conducts purchase (YES at B40), the MODE is set to "purchase completed" (C30). If it is predicted that the customer does not conduct purchase (NO at B40) or after C30, the processing proceeds to the decision making stage of the next area selection A40.

In the next area selection A40, the next area to which the customer advances is predicted. For example, a shift destination for which the highest probability is output in the next area selection model having the area where the customer is now located as a shift origin is predicted as the next area.

Thereafter, the customer is made to exit the current area (C40), move to the next area determined at A40 (C50), and enter the area (A10).

Referring back to FIG. 1, the behavior history & moving trail analysis unit 500 will now be described.

Figure 15:
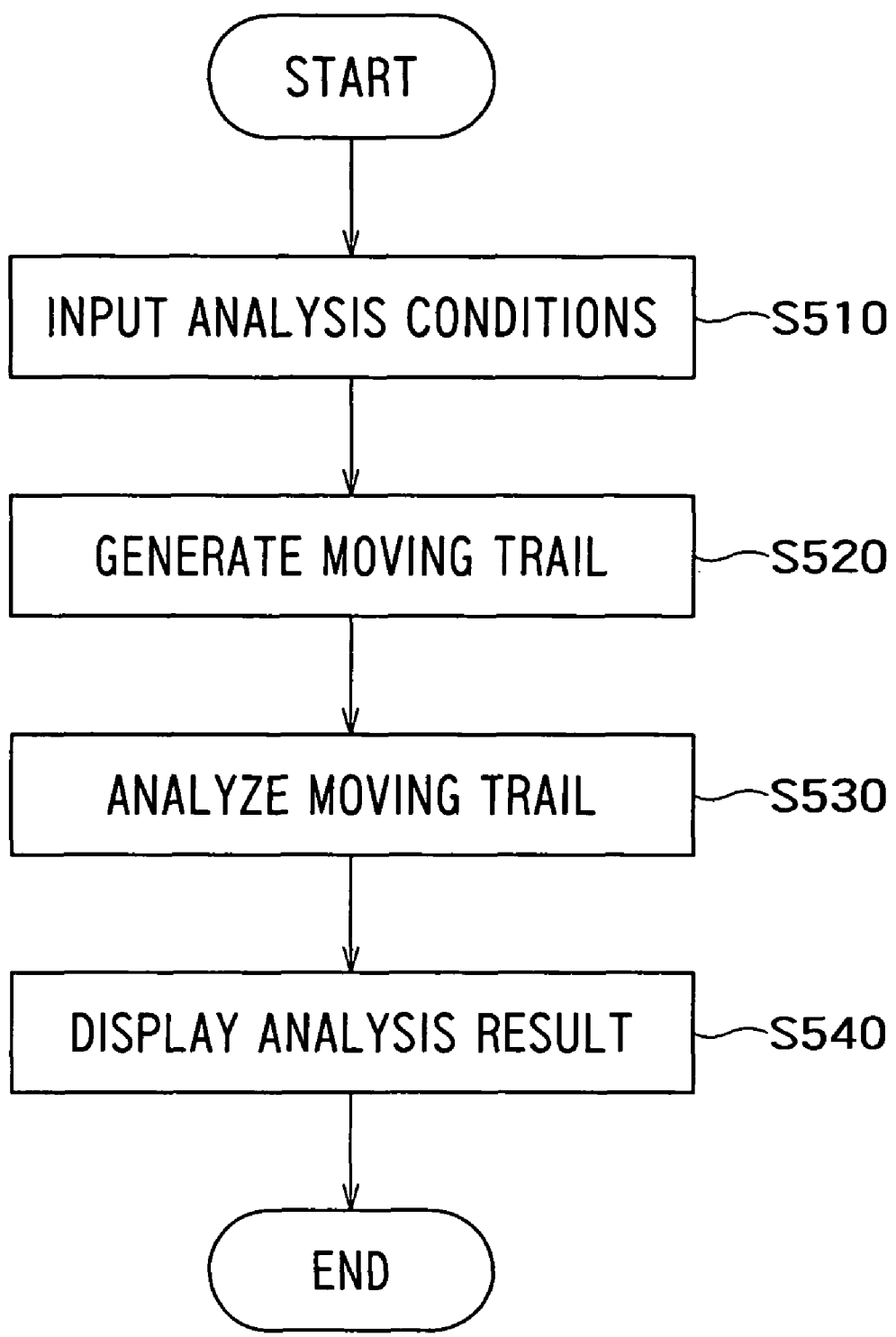
FIG. 15 is a flow chart showing processing conducted by a behavior history & moving trail analysis unit.

FIG. 15 is a flow chart showing a flow of processing conducted by the behavior history & moving trail analysis unit 500.

The behavior history & moving trail analysis unit 500 urges the user to input analysis conditions on the screen on the input-output device 10 (S510).

On the basis of the individual behavior history database 830 in the prediction database storage unit 800, the behavior history & moving trail analysis unit 500 generates moving trail data of each individual (data indicating the area movement history of an individual) by a predetermined form (S520).

On the basis of the moving trail data of all individuals, the behavior history & moving trail analysis unit 500 conducts a moving trail analysis in accordance with the analysis conditions specified by the user (S530).

The behavior history & moving trail analysis unit 500 displays a result of the moving trail analysis on the screen of the input-output device 10 (S540). As a result, the user can know the whole flow of customers in the store.

According to the present embodiment, the movement frequency in the field can be predicted as heretofore described. Even at a virtual layout change or installation of a guide device, therefore, it becomes possible to propose a measure based on the predicted movement frequency.

Furthermore, by regarding the predicted movement frequency as a movement of customers (crowd), it becomes possible to approximately take the influence of surrounding crowd upon behavior selection of an individual, in the conventional individual behavior selection model. In other words, behavior selection of an individual can be predicted with due regard to the influence of the movement of the surrounding crowd upon the individual.

Furthermore, when simulating the behavior in the field on the basis of the behavior selection model in the present embodiment, a remarkable calculation cost reduction is expected, as compared with conventional simulation conducted with regard to the interaction with the surrounding crowd in real time.

What is claimed is:

1. A customer behavior prediction apparatus comprising:
an area attribute database which stores area attributes of each of a plurality of areas in an activity area of customers in a store;
an inter-area attribute database which stores inter-area attributes between the areas in the activity area;
a behavior history database which stores behavior history of the customers in the activity area;
a movement frequency database generator which generates a movement frequency database representing a movement frequency between each of the areas in the activity area on the basis of the behavior history database;
a movement frequency model estimator which estimates a value of a parameter in a movement frequency model having the area attributes and the inter-area attributes of the areas in the activity area as inputs and a movement frequency, as a probability distribution, between each of the areas in the activity area as an output;
a movement frequency prediction unit which generates a prediction movement frequency database which represents the movement frequency between the areas of each of the customers in the activity area corresponding to a maximum probability or an average movement frequency between the areas in the activity area based on the probability distribution out of the movement frequency model;
an individual attribute database which stores the individual attributes of each of the customers;
a behavior selection model estimator which estimates a value of a parameter in a behavior selection model to obtain behavior selection of a customers at a subject time from the individual attributes of the customer, the area attributes and the inter-area attributes of the areas in the activity area, a movement frequency between each of the areas in the activity area, and behavior history of the customers ending at the subject time; and
a behavior selection prediction unit which inputs individual attributes of a subject customer, area attributes and inter-area attributes of areas in a subject activity area, a movement frequency between each of the areas in the subject activity area estimated by the movement frequency model, and behavior history of the subject customer ending at the subject time in the subject activity area to the behavior selection model, and predicts behavior selection of the subject customer at the subject time.

2. The customer behavior prediction apparatus according to claim 1, wherein the behavior selection model uses area attributes of an area where the subject customer individual as the subject of the prediction is located and inter-area attributes including the area where the subject customer is located this area, as the area attributes and the inter-area attributes in the activity area as the subject of the prediction, and uses a movement frequency of inter-area having at least this area as a shift origin or a shift destination, as the movement frequency in the subject activity area as the subject of the prediction.

3. The customer behavior prediction apparatus according to claim 1, wherein the behavior selection model is a model that outputs probabilities with which respective behavior selections corresponding to the behavior selection model are selected by the customer individual, and
the behavior selection prediction unit predicts behavior selection of the subject customer individual from the probabilities output by the behavior selection model.

4. The customer behavior prediction apparatus according to claim 1, wherein the behavior selection prediction unit predicts transition of behavior selection of the subject customer individual as the subject of the prediction by using a simulation model, and successively records the behavior selection of the subject customer individual as behavior history.

5. The customer behavior prediction apparatus according to claim 4, further comprising a moving trail data generator which generates moving trail data indicating movement history of the individual as the subject customer of the prediction, from the behavior history.

6. The customer behavior prediction apparatus according to claim 5, further comprising a moving trail analysis unit which conducts a moving trail analysis by using the moving trail data of a plurality of customers.

7. A customer behavior prediction method comprising:
reading out data from a behavior history database which stores behavior history of customers in a plurality of areas in an activity area in a store;
generating a movement frequency database representing a movement frequency between the areas in the activity area;
reading out data from an area attribute database which stores area attributes of each of the a plurality of areas in the activity area, an inter-area attribute database which stores inter-area attributes between each of the areas in the activity area, and the movement frequency database;
estimating, using a computer, a value of a parameter in a movement frequency model having the area attributes and the inter-area attributes of the areas in the activity area as inputs, and a movement frequency, as a probability distribution, between each area in the activity area as an output;
generating, using a computer, a prediction movement frequency database which represents the movement frequency between the areas of each of the customers in the activity area corresponding to a maximum probability or an average movement frequency between the areas in the activity area based on the probability distribution out of the movement frequency model;
reading out data from an individual attribute database which stores the individual attributes of each of the customers;
estimating, using a computer, a value of a parameter in a behavior selection model to obtain behavior selection of a customer at a subject time from the individual attributes of the customer, the area attributes and the inter-area attributes of the areas in the activity area, a movement frequency between each area in the activity area, and behavior history of the customer ending at the subject time; and
inputting individual attributes of a subject customer, area attributes and inter-area attributes in a subject activity area, a movement frequency between each area in the subject activity area estimated by the movement frequency model, and behavior history of the subject customer ending at the subject time in the subject activity area to the behavior selection model, the behavior selection model predicting behavior selection of the subject customer at the subject time.

8. A computer-readable recording medium storing computer-executable instructions for causing customer behavior prediction program to make a computer to execute a behavior prediction method, the behavior prediction method comprising:

reading out data from a behavior history database which stores behavior history of customers in a plurality of areas in an activity area in a store;

generating a movement frequency database representing a movement frequency between the areas in the activity area;

reading out data from an area attribute database which stores area attributes of each of the a plurality of areas in the activity area, an inter-area attribute database which stores inter-area attributes between each of the areas in the activity area, and the movement frequency database;

estimating a value of a parameter in a movement frequency model having the area attributes and the inter-area attributes of the areas in the activity area as inputs, and a movement frequency, as a probability distribution, between each area in the activity area as an output;

generating a prediction movement frequency database which represents the movement frequency between the areas of each of the customers in the activity area corresponding to a maximum probability or an average movement frequency between the areas in the activity area based on the probability distribution out of the movement frequency model;

reading out data from an individual attribute database which stores the individual attributes of each of the customers;

estimating a value of a parameter in a behavior selection model to obtain behavior selection of a customer at a subject time from the individual attributes of the customer, the area attributes and the inter-area attributes of the areas in the activity area, a movement frequency between each area in the activity area, and behavior history of the customer ending at the subject time; and inputting individual attributes of a subject customer, area attributes and inter-area attributes in a subject activity area, a movement frequency between each area in the subject activity area estimated by the movement frequency model, and behavior history of the subject customer ending at the subject time in the subject activity area to the behavior selection model, the behavior selection model predicting behavior selection of the subject customer at the subject time.

* * * * *